United States Patent [19]

Mimura et al.

[11] 4,251,587

[45] Feb. 17, 1981

[54] SHEET MATERIAL AND METHOD OF PRODUCING THE SAME

[75] Inventors: Koji Mimura; Toru Takemura; Yoshikazu Fujinaga, all of Otake, Japan

[73] Assignee: Mitsubishi Rayon Company, Limited, Tokyo, Japan

[21] Appl. No.: 918,427

[22] Filed: Jun. 23, 1978

[30] Foreign Application Priority Data

Jun. 29, 1977 [JP] Japan .................................. 52/77597

[51] Int. Cl.³ .............................................. B32B 5/02
[52] U.S. Cl. ..................................... 428/233; 28/104; 428/239; 428/245; 428/253; 428/297; 428/298; 428/299; 428/302; 428/303; 428/903; 428/904
[58] Field of Search ............... 428/233, 234, 236, 238, 428/245, 253, 280, 284, 286, 287, 299, 300, 301, 302, 303, 903, 904; 28/104, 107, 103, 112

[56] References Cited

U.S. PATENT DOCUMENTS

| | | | |
|---|---|---|---|
| 2,543,101 | 2/1951 | Francis | 428/239 |
| 2,862,251 | 12/1958 | Kalwaites | 428/131 |
| 2,943,010 | 6/1960 | Stefl et al. | 428/239 |
| 3,068,547 | 12/1962 | L'Hommedieu | 428/239 |
| 3,214,819 | 11/1965 | Guerin | 28/104 |
| 3,769,659 | 11/1973 | Kalwaites | 28/104 |
| 3,819,465 | 6/1974 | Parsons et al. | 28/112 |
| 4,146,663 | 3/1979 | Ikeda et al. | 428/96 |

Primary Examiner—James J. Bell
Attorney, Agent, or Firm—Oblon, Fisher, Spivak, McClelland & Maier

[57] ABSTRACT

A sheet material is formed of a base cloth consisting of a woven fabric, knit fabric, nonwoven fabric, or web material having a favorable form stablity and a short fiber material consisting at least partly of a natural fiber material, said sheet material having a structure in which said base cloth is covered on at least one surface with the short fiber material and a part of the short fiber material is stuffed into the gaps in the network of the base cloth so that the base cloth and short fiber material are substantially integrated with each other.

30 Claims, No Drawings

SHEET MATERIAL AND METHOD OF PRODUCING THE SAME

BACKGROUND OF THE INVENTION

Field of the Invention

The present invention relates to a new sheet material having an excellent hand and good draping characteristics.

Many attempts have been made to make synthetic sheet materials which look like natural sheet materials. Thus, for example, various products have been marketed as artificial leathers and synthetic leathers. The objective has been to produce products which are similar to natural sheet materials and which have the excellent performance characteristics of natural leathers by using comparatively cheap synthetic fibers and semi-synthetic fibers in the preparation of the synthetic sheet materials. However, the synthetic materials have been substantially inferior to natural sheet materials in hand and other sheet characteristics.

It has also been often attempted to make sheet materials from natural fibers as is evident from felts which utilize the fulling action of wool. However, such products are substantially inferior to knit and woven fabrics and sheet materials obtained from synthetic fibers in such physical performance characteristics as form stability. Moreover, excellent sheet materials have not yet been obtained. In other words, as is obvious also from a detailed structure analysis of natural leathers, it is thought that they are a kind of compound structural body. In the case of artificially made materials, it will be necessary to compound various functions. But this has not yet been realized. Therefore, a need continues to exist for an improved synthetic sheet materials which possesses the characteristics of natural materials.

SUMMARY OF THE INVENTION

Accordingly, one object of the present invention is to provide a sheet material wherein a base cloth which possesses excellent form stability and a natural fiber material which has excellent hand and good hygroscopicity characteristics are compounded with each other.

Briefly, this object and other objects of the present invention as hereinafter will become more readily apparent can be attained in a sheet material formed of a base cloth consisting of a woven fabric, knit fabric, nonwoven fabric or web material having good form stability and a short fiber material consisting at least partly of a natural fiber material, the base cloth being covered at least on one surface with the short fiber material and a part of the short fiber material being stuffed into the gaps in the network of the base cloth so that the base cloth and short fiber material are substantially integrated with each other.

DESCRIPTION OF THE PREFERRED EMBODIMENTS

In the sheet material of the present invention, such physical characteristics as strength and elongation depend substantially on the base cloth, and the short fiber material substantially contributes to improvement in the touch, hand, hygroscopicity and various other functions of the product. In other words, such a sheet material which possesses excellent physical properties derived from a base cloth of artificial fibers which contributes strength and elongation characteristics, form stability and drape to the overall product and which possesses various properties contributed from a natural fiber material such as excellent hand, hygroscopicity and heat insulation is not known. Such a sheet material is formed by integrally compounding the base cloth and the natural fiber and the respective features of the components are well developed. On the other hand, when an elastic polymer is to be used, it contributes a so-called binder action to the interaction of the two components or, in other words, of more strongly integrally compounding the base cloth and short fiber material with each other and more substantially improving the character of the sheet. This is the main role of the elastic polymer. Further, in the sheet material of the present invention, since it is covered at least on one surface with a short fiber material of natural fibers excellent in touch and hand, the functions of the base cloth and short fiber material elucidated above can be more smoothly shared. The component weight ratio of the base cloth to the short fiber material which makes possible a material which exhibits such functions ranges from 1:4 to 4:1, more preferably 3:7 to 6:4.

The so-called base cloth of the present invention is a knit fabric, woven fabric, nonwoven fabric or web material made of known artificial fibers (staples or filaments) or natural fibers all of which possess favorable form stability, and is preferably a knit or woven fabric. Preferred examples of artificial fibers include polyester fibers, polyamide fibers, polyolefin fibers, polyacrylonitrile fibers, polyvinyl alcohol fibers, polyvinyl chloride fibers, cellulose fibers and acetate fibers. As natural fibers, cotton, silk, wool and hemp fibers are preferred. Needless to say, a base cloth consisting of two or more kinds of fibers is also within the scope of the present invention. As explained above, the base cloth principally determines the physical properties of the present sheet material. Therefore, from this viewpoint, it is preferable to use a base cloth made of fibers which have a latent shrinkability. That is to say, when a base cloth consisting of fibers having a latent shrinkability and a short fiber material are treated and integrated with each other and the base cloth is then shrunk, the effects attained are that of holding the short fiber material group so strongly that it is prevented from dropping and to simultaneously reduce the specific volume (cm$^3$./g.) of the sheet, rendering the sheet more compact and making the physical properties of the sheet the same as those of the base cloth. It is preferable that the shrinkage of the base cloth range from 10 to 60%, referring to the side shrinkage of the base cloth. Further, when fibers having both latent shrinkability and latent spontaneous elongatability are used, they will be shrunk and then will be further somewhat spontaneously elongated so as to further improve the drape of the product thereby yielding favorable results in most cases.

In the short fiber material component of the sheet material of the present invention usually at least a portion of the fibers, preferably at least 12% of the fibers is a natural material. The natural short fibers which are a part of the short fiber material of the invention include animal fibers such as collagen fibers; short cut silk obtained by releasing the hair of such animals as sheep, goats and rabbits; the feathers and/or down of water birds and hens and animals hides; vegetable fibers such as cotton, hemp and pulp; and mineral fibers such as asbestos fibers. In other words, any natural fiber having the desired functions may be used. When the sheet product of the present invention is to be used in the manufacture of clothing, the use of animal fibers in the preparation of the short fiber material is preferred. Further, a feature of the present invention is that, since conventional spinning is not performed in the preparation of the sheet material, collagen fibers obtained by releasing waste wool from a spinning carding step or tanning wastes produced from an animal hide tanning step and feathers which cannot be spun can be also utilized. It is also within the scope of the invention to employ a mixture of two or more of the above natural fiber materials or a mixture of the above mentioned natural fiber materials with other fibers in the preparation of the short fiber material component of the product of the present invention.

For the elastic polymer which is another component of the present invention, suitable known elastic polymers such as polyurethane, acryl rubber, nitrile rubber, butadiene rubber, chloroprene rubber and the like can be used. Such elastic polymers need not be always used in the present invention but, particularly, when the sheet material is to be used for clothing, for the purposes of making the sheet stiff and to more strongly integrate the short fiber material and base cloth with each other, it is preferred to use the elastic component in an amount of less than 50%, preferably about 2 to 20% of the total weight of the base cloth and short fiber material.

In the instance when a mixture of collagen fibers and microfibers smaller than 1.0 denier is used as the short fiber material the desirable quantities of the base cloth, collagen fibers, microfibers and elastic polymer are 30 to 67%, 3 to 40%, 30 to 67% and less than 10% respectively of the total weight of the base cloth, collagen fibers and microfibers.

A concrete example of the method of producing sheet materials of the present invention is explained as follows. First, a laminate of a base cloth and a web (which may be a temporarily bonded web material) of a short fiber material is formed. The web of short fiber material can be formed by a method in which the short fibers are formed into a parallel web or random web by a conventional web forming device, by a method in which the fibers are beaten, divided and then wet-sheeted or by a method in which the fibers are beaten, divided and then formed into a dry web by air streams or the like. In such case, a web of only the short fiber material may be formed, and may be, as required, temporarily bonded for easier handling and then can be laminated to the base cloth. Alternatively, the laminate may be prepared by forming a web directly on the base cloth by a wet-sheet forming method. The thus obtained laminate of the base cloth and web is then treated so that the components integrate with each other. This integrating treatment is accomplished by a known needle-punching method or more preferably, by a method wherein the above mentioned laminate is mounted on a supporting member substantially smooth on its surface and the laminate is subjected to the agitating action of liquid columnar streams, liquid spray streams or film-like liquid streams. In the latter method wherein the liquid streams are used, the supporting member on which the laminate is mounted may be anything which is substantially so smooth on its surface that the pattern of the supporting member is not formed on the sheet and the jetted liquid may be quickly removed. Such a suitable supporting member is one in which the concavoconvex pattern is so large that an undesirable pattern is formed on the sheet, but nevertheless, it may well be used depending on the performance required of the sheet. The liquid used may be anything other than the solvent for the fibers to be treated. However, water or warm water is most preferred with respect to its ease of handling and economy.

The integrated laminate is then treated, as required, by being shrunk, treated with an elastic polymer, dyed or otherwise finished. Any known technique can be applied for such treatments. The laminate can be made into a suede-like or velour-like sheet material by being napped on its surface and can also be formed into long hair garments such as artificial furs.

As explained above, in the sheet material of the present invention, a base cloth having favorable form stability and a short fiber material consisting at least partly of a natural material are integrally compounded with each other. The desired form stability of the base cloth and the excellent hand and hygroscopicity of the natural fiber material are both retained in the resultant product to form an excellent sheet material.

Having generally described this invention, a further understanding can be obtained by reference to certain specific examples which are provided herein for purposes of illustration only and are not intended to be limiting unless otherwise specified. In all examples the component quantities are by weight and the cantilever bending length and strength are measured according to JIS L-1079-1966.

EXAMPLE 1

A flat woven fabric of a weight of 65 g/m$^2$ consisting of polyester fibers having a shrinkage of 35% in boiling water was formed. On the other hand, a card web of a weight of 70 g/m$^2$ consisting of 100% Merino wool formed in an ordinary manner, was mounted on the above mentioned flat woven polyester fabric and was needle-punched by a known method to integrate the web with the fabric as a sheet, and then the sheet was shrunk in hot water at 80° C. After the sheet was simultaneously dried and thermoset at 160° C., a sheet material having a greater form stability than a conventional felt was obtained.

EXAMPLE 2

The laminate of the polyester fabric and waste wool web in Example 1 was mounted on a flat woven fabric net of 60 mesh and the same was subjected to a high pressure columnar water jet stream under a pressure of 30 kg/cm$^2$ by using a fluid jetting nozzle of an orifice diameter of 0.15 mm to integrate the web with the fabric. The same treatment was affected twice under a pressure of 50 kg/cm$^2$ (gauge). The sheet was then treated with the same columnar jet stream under a pressure of 50 kg/cm$^2$ (gauge) once on the front and back surfaces on a metal roll of a diameter of 20 cm. Then the sheet was shrunk in hot water at 90° C. and was simultaneously dried and thermoset. The sheet obtained was a felt-like material covered on both surfaces with felted wool and had favorable form stability.

EXAMPLE 3

A tricot knit texture of a weight of 60 g/m$^2$ consisting of latently shrinkable polyester filaments of 75d/50f and having a shrinkage of 40% in boiling water was used as a base cloth. Feathers used for commercial feather cushions were laminated on the base cloth. The laminate was subjected to a high pressure columnar water jet stream under a pressure of 35 kg/cm$^2$ (gauge) through a fluid jetting nozzle of an orifice diameter of 0.15 mm from the feather side so as to integrate the feathers with the base cloth. The integrated material was then shrunk in boiling water to compact the material which was dried and thermoset at 160° C. The sheet obtained was structured such that the feathers passed through the mesh of the tricot knit texture, was covered on the back side by the fluid jetting treatment with soft feathers consisting mostly of fluffs, was bulky, had a very soft touch and had excellent heat insulation properties.

EXAMPLE 4

A flat woven fabric of a weight of 70 g/m$^2$ consisting of acryl spun yarns having a shrinkage of 20% in boiling water was integrated with a waste wool web by the same method as described in Example 2, and the integrated material was shrunk, and was then treated with a water-soluble urethane solution. The solution was removed from the integrated material so that the amount of the deposited urethane was 5% by weight, was then dried and was heat-treated at 160° C. The thus obtained sheet was covered on both surfaces with wool and had the excellent hand of a natural leather.

EXAMPLE 5

A Jersey knit texture consisting of polyester fibers having a shrinkage of 25% in boiling water was spread as expanded in an amount of 50 g/m$^2$ on a net of 80 mesh made of stainless steel, was laminated with a waste wool web and was then treated to integrate the components in the same manner as described in Example 2. The laminate was shrunk, dehydrated, and was then treated with an aqueous solution of urethane. The laminate was then squeezed to remove remaining solution so that the amount of the deposited urethane was 8% by weight, and then was dried and heat-treated at 160° C. The thus obtained sheet was covered on both surfaces with wool and had the touch of a natural leather.

EXAMPLE 6

A gauze fabric of a weight of 30 g/m$^2$ was formed from polyester filament yarns having a shrinkage of 35% in boiling water and 40 deniers/24 filaments. On the other hand, goose feathers (fluffs) were treated for 10 minutes in hot water above 90° C. and were then passed wet through a gear crimper in order to soften the hard core parts. The goose feathers were then formed into a web material of a weight of 50 g/m$^2$ by a wet-sheeting method.

Then the feather web was laminated on the above mentioned gauze fabric and was subjected to a high pressure water jet stream under a pressure of 20 kg/cm$^2$ (gauge) through a nozzle of an orifice diameter of 0.2 mm and an orifice interval of 1 mm in order to integrate the web with the gauge. The laminate was then further laminated with a card web of a weight of 30 g/m$^2$ consisting of acryl fibers of 1.5 deniers and a length of 30 mm which had a shrinkage value of 15% in boiling water. The surface of the laminate was treated with a high pressure water jet stream such that the fibers passed through the web and intermingled by the force of the water jet streams under a pressure of 35 kg/cm$^2$ (gauge) through a jetting nozzle of an orifice diameter of 0.2 mm and a pitch of 1 mm. When the laminate was shrunk for 5 minutes in hot water at 98° C. and dried with hot air, the sheet obtained had an unprecedentedly high hand and bulkiness and had satisfactory physical properties.

EXAMPLE 7

A tricot knit texture of a mesh of 150 cm/480 courses was prepared by using filament yarns of 60 deniers/36 filaments consisting of a polyester having a shrinkage of 40% in boiling water. On the other hand, hen feathers from a broiler hen were passed between a pair of rollers having a clearance of 0.2 mm, were further passed through a gear crimper to soften the feathers by crushing the hard core parts and were laminated on the previously prepared base cloth in a weight of 40 g/m$^2$ by air conveyance. The feathers were then intermingled with the base cloth with a high pressure water jet stream of 10 kg/cm$^2$ (gauge) and a jet stream of 30 kg/cm$^2$ (gauge).

Thereafter, viscose fibers which had a fineness of 0.2 denier and a cut length of 4 mm and chrome collagen were mixed in a ratio of 1:1, were beaten and were formed into a sheet directly on the integrated sheet. The amount formed into a sheet was 40 g/m$^2$. The water streams were jetted on the sheet under pressures of 10 and 40 kg/cm$^2$ (gauge) through a jetting nozzle of an orifice diameter of 0.2 mm and a pitch of 1 mm to integrally intermingle the fibers. Then the sheet was treated to shrink the fibers for 5 minutes in hot water at 98° C. and was dried with hot air. The sheet obtained was excellent in hand and bulkiness by the presence of the feathers on the front surface, had a soft natural leather-like hand on the back surface and was an entirely new sheet material excellent in draping properties and hand.

EXAMPLE 8

A single jersey of a mesh of 150 cm/540 loops was prepared from polyester filaments of 80d/36f and had a shrinkage in boiling water of 45%. On the other hand, a spinning solution of a polymer concentration of 16% was prepared by dissolving a copolymer consisting of 92% acrylonitrile and 8% acrylic acid in dimethylacetamide and was spun into an aqueous solution of 50% dimethylacetamide at 40° C. by using a spinneret having an orifice diameter of 0.04 mm. The fibers obtained were elongated, dried and relaxed and yielded fibers of 0.15 deniers. These fibers were cut into lengths 3 mm long, were divided and beaten in water by a known method. On the other hand, tannin collagen fibers which were tannin tanned natural leather wastes were beaten in water in the same manner. The acryl microfibers and tannin collagen fibers were mixed together in a ratio of 3/1 and were temporarily bonded in an amount of 40 g/m$^2$ by using a long net type sheet to prepare a paper. The paper obtained was laminated on the above mentioned polyester knit texture. The laminate was mounted on a gauze woven plastic net of 90 mesh and was continuously treated with columnar streams of high pressure water under a pressure which increased in turn in the order of 15, 30 and 50 kg/cm$^2$ by using a liquid jetting nozzle having an orifice diameter of 0.15 mm from the side of the paper. The sheet obtained was reversed and another sheet of the above mentioned paper was laminated on it. The laminate was again mounted on the 90 mesh net and was treated with the same columnar streams so that the fibers were integrally intermingled. When the thus obtained sheet was dipped in boiling water to shrink the same, the side shrinkage was 30% laterally and 25% longitudinally.

When this sheet was dyed with a cationic dye, it was dyed very clearly. When it was napped by buffing on bath surfaces, a leather-like structure closely resembling a natural suede leather was obtained. The physical performance characteristics of the obtained leather-like structure are as mentioned below. Its touch and draping were so excellent that it could not be distinguished from a conventional artificial leather. It smelled slightly like a natural leather and had a very high dehydroscopicity.

The product had a weight of 250 g/m$^2$, a thickness of 0.4 mm, a cantilever bending length of 2.1 cm and a strength of 190 kg/cm/g/cm$^2$. The component ratio by weight of the polyester fibers/microfibers/collagen fibers was 6/6/2.

EXAMPLE 9

The paper temporarily bonded by using 5% (on fibers) polyacrylamide of a weight of 30 g/m$^2$ and consisting of 100% acryl microfibers as obtained in Example 8 was obtained by a wet-sheeting method. On the other hand, a tricot knit texture of a mesh of 160 cm/480 courses was prepared from the high shrinkage polyester fibers used in Example 8. First, the tricot knit texture and the above mentioned temporarily bonded acryl microfiber paper were laminated with each other. The laminate was mounted on a stainless steel 80 mesh net and was treated with columnar streams under pressures in the order of 15, 30 and 30 kg/cm$^2$ (gauge) by a liquid jetting nozzle having an orifice diameter of 0.15 mm so that the fibers were integrally intermingled. Then another mixed sheet paper of acryl microfibers/collagen fibers=3/1 as used in Example 8 was mounted on the same side and the laminate was treated with columnar streams under pressures in the order of 15, 50 and 50 kg/cm$^2$ (gauge). The obtained sheet was then shrunk in boiling water so that it had a side shrinkage of 29% and was set by dry heating at 160° C. The sheet was then dyed with a cationic dye and was buffed on the side touched directly by the columnar streams. It was observed that the acryl microfibers had passed through the base on the side opposite to the side touched directly by the columnar streams. The product had a very soft touch.

The physical performance characteristics of the obtained leather-like structure are as shown below. The sheet had a weight of 240 g/m$^2$, a thickness of 0.43 mm, a cantilever bending length of 2.1 cm, a strength of 180 kg/cm/g/cm$^2$ and a ratio of polyester fibers/acryl microfibers/collagen fibers of 6/6/1.

EXAMPLE 10

A spinning solution of 19% was prepared by dissolving a copolymer of 94% acrylonitrile and 6% vinyl acetate and was spun into an aqueous solution of 40% dimethylacetamide at 30° C. by using a spinneret having an orifice diameter of 0.03 mm. The filaments obtained were elongated, dried and relaxed to obtain microfibers of 0.09 denier. These microfibers were cut to a length of 2 mm long and were beaten in water together with collagen fibers—acryl microfibers/collagen fibers of 3/2.

Then a flat woven fabric of a weight of 50 g/m$^2$ was prepared according to a known method from polyester fiber (of a shrinkage of 35% in boiling water) staples having a latent shrinkability. Then, by using a round net sheeting machine, a beaten slurry consisting of the above mentioned acryl microfibers and collagen fibers was formed into a sheet on the flat woven fabric. The material obtained was treated with columnar streams on a plastic 60 mesh net from the microfiber side under pressures of 15, 20, 30 and 50 kg/cm$^2$ (gauge) in the order mentioned and was further treated with columnar streams under a pressure of 50 kg/cm$^2$ (gauge) on metal rolls of a diameter of 20 cm. The thus obtained sheet was shrunk in boiling water and was further dried and thermoset at 170° C. When it was dyed in an ordinary manner and was further treated with a silicone series oil agent (3% on the total weight of the fibers), a suede leather-like material having good draping properties and soft touch was obtained. Its physical performance characteristics are as mentioned below.

It was of a weight of 200 g/m$^2$, a thickness of 0.4 mm, a cantilever bending length of 2.0 cm, a strength of 200 kg/cm/g/cm$^2$ and had a ratio of polyester fibers/acryl microfibers/collagen fibers of 5/3/2.

EXAMPLE 11

When the leather-like material obtained in Example 9 was painted with a polyurethane emulsion (3% based on the total weight of the fibers) on the side treated with the columnar streams and was dried at 140° C., a stiff sheet having a natural leather-like drape was obtained. Its physical performance characteristics are as follows. It had a weight of 247 g/m$^2$, a thickness of 0.4 mm, a cantilever bending length of 2.7 cm and a strength of 195 kg/cm/g/cm$^2$.

EXAMPLE 12

A viscose of a salt point of 8 consisting of a cellulose concentration of 7% and an alkali concentration of 4% was spun into a spinning bath of 100 g/l of sulfuric acid, 350 g/l of sodium sulfate and 12 g/l of zinc sulfate at 40° C. by using a Pall filter rigimesh sheet (made by Pall Trinity Micro Corp., U.S.A.) of a filter rating of 5 microns as a nozzle, was then elongated to an extent 1.5 times as long in an elongating bath of 5 g/l of sulfuric acid at 60° C. and was desulfurized and water-washed in an ordinary manner to obtain fibers of 0.08 denier (of a cut length of 3 mm). These fibers were beaten in water in an ordinary manner. On the other hand, chrome collagen fibers were also beaten in water in an ordinary manner.

Also, separately a card web consisting of acryl fibers of 2.0 deniers (as shrunk by 20% in saturated stream under 1.5 kg/cm$^2$ (gauge) having a latent shrinkability was prepared and was lightly needle-punched to prepare a web of 50 g/m$^2$. The previously prepared wet-sheet web of cellulose microfibers/collagen fibers of 3/1 was mounted on this web and was treated with divergent spray streams under pressures of 30 and 50 kg/cm$^2$ (gauge) in the order mentioned on a metal screen of 80 mesh. Further, the same treatment was repeated once again. The obtained sheet was shrunk with saturated steam under a pressure of 1.5 kg/cm$^2$ (gauge) and was then dried. When it was impregnated with a polyurethane emulsion (3% based on the total weight of the fibers) and was dried, a natural leather-like sheet was obtained. Its physical performance characteristics are as follows.

It had a weight of 230 g/m$^2$, a thickness of 0.8 mm, a cantilever bending length of 2.7 cm, a strength of 210 kg/cm/g/cm$^2$ and an acryl fibers/cellulose microfibers/collagen fibers ratio of 5/6/2.

EXAMPLE 13

A web was formed in an ordinary manner from compound fibers of 1.0 denier and consisting of a polyester and nylon 6 and having a cross-section equally divisible into 8 parts was treated at 80° C. in an aqueous solution of 1-Normal caustic soda to reach a very finely divided state. Collagen fibers (beaten) were formed into a sheet on this web, were mounted on a polyester fiber knit texture and were treated with columnar streams under the pressures of 15, 30 and 60 kg/cm² (gauge) on a stainless steel net of 100 mesh. Thereafter, the sheet was turned over, was treated with the same columnar streams, was shrunk in boiling water and was dried and thermoset at 150° C. When the obtained sheet was napped on both surfaces, a leather-like material very similar to a natural suede was obtained. The physical performance characteristics of this leather-like material are as follows.

It had a weight of 220 g/m², a thickness of 0.6 mm, a cantilever bending length of 2.3 cm, a strength of 180 kg/cm/g/cm² and a polyester fibers/polyester microfibers/nylon microfibers/collagen fibers ratio of 6/2/2/1.

EXAMPLE 14

A copolymer of an ultimate viscosity of 1.7 (measured in dimethylformamide at 25° C.) consisting of 92% by weight acrylonitrile, 7.5% by weight methyl acrylate and 0.5% by weight sodium methallylsulfate was dissolved in dimethylacetamide to prepare a spinning solution of a polymer concentration of 17% by weight. The solution was spun into an aqueous solution of 50% by weight dimethylacetamide at 50° C., was elongated to a length 4 times its original length in boiling water, was dried and was then further elongated to a length 1.5 times as long with dry heat at 160° C. whereby a tow of 0.15 dpf (denier per fiber) was obtained. The fibers were relaxed by 10% in saturated steam and were then cut into 3 mm lengths. These microfibers and a natural pulp were mixed together at a ratio of 90/10 (by weight) and were formed into a sheet with a round net sheeting machine whereby a paper-like mixed web material of a weight of 30 g/m² was obtained.

Apart from this, a single jersey of a dimension of 180 cm/540 loops and a weight of 50 g/m² was prepared in an ordinary manner from polyester filaments of 80 d/36 f having a latent boiling water shrinkage of 40%. The above mentioned mixed web material (undried) was mounted on it. The laminate was mounted on a metal screen of 80 mesh and was integrated with columnar water streams under pressures of 15, 30 and 40 kg/cm² (gauge) in turn by using a liquid jetting nozzle having an orifice diameter of 0.15 mm from the mixed web material side. Another mixed web material which was the same as that mentioned above was mounted on the obtained sheet and was treated with columnar streams under the same conditions. The obtained sheet was dehydrated and was then dipped in boiling water to shrink the same. In this case, the side shrinkage was 35% in the MD direction and 30% in the CD direction. When the shrunken sheet was dried at 150° C., was thermoset and was further napped, a sheet was obtained which had the following physical property values: A very excellent soft touch and drape and a hand close to that of a natural suede. That is, it had a thickness of 0.7 mm, a weight of 230 g/m², a cantilever bending length of 21 mm and a strength of 190 kg/cm/g/cm².

EXAMPLE 15

A viscose of a salt point 8 consisting of 7% by weight cellulose concentration and 4% by weight alkali concentration was spun into a spinning bath of 100 g/l of sulfuric acid, 350 g/l of sodium sulfate and 12 g/l of zinc sulfate at 40° C. by using a Pall filter rigimesh sheet (made by Pall Trinity Micro Corp., U.S.A.) of a filter rating of 5 microns as a spinneret and the spun fibers were elongated to a length 1.5 times as long in an elongating bath of 5 g/l of sulfuric acid at a temperature of 60° C. The fibers were regenerated in an ordinary manner and were then cut to a length of 2.5 mm. The single fiber fineness of these fibers was 0.08 denier. These microfibers and a natural pulp were mixed at a ratio of 95/5 (by weight) and were beaten into a uniform slurry. This material was formed into a web sheet of a weight of 30 g/m² and was set-treated with columnar water streams in the same manner as described in Example 14 from the mixed web material side. This sheet was turned over, was once again wet-sheeted on the back side to form a web having a weight of 30 g/m². The obtained sheet was shrunk in boiling water and was thermoset and dried at 160° C. to obtain a suede sheet of a soft touch having the following physical property values. That is to say, it was of a thickness of 0.6 mm, a weight of 220 g/m², a strength of 218 kg/cm/g/cm² and a cantilever bending length of 23 mm.

EXAMPLE 16

The sheet obtained in Example 15 was napped, was impregnated with a polyurethane dimethylformamide solution in an amount of 5% on the total weight of the fibers (the base cloth+microfibers+pulp), was coagulated and was dried. The sheet obtained was of a thickness of 0.6 mm, a weight of 230 g/m², a strength of 270 kg/cm/g/cm² and a cantilever bending length of 28 mm.

EXAMPLE 17

A web of a weight of 50 g/m² was prepared from unrelaxed acryl fibers (2d×51m) spun in an ordinary manner, was mounted on a plastic net of 60 mesh and was continuously jet-treated with columnar water streams under pressures of 15 and then 30 kg/cm² (gauge) by using a liquid jetting nozzle having an orifice diameter of 0.15 mm. The same mixed web as was used in Example 14 was mounted on the intermingled nonwoven fabric obtained and was jet-treated with columnar water streams under pressures of 15, 30 and 30 kg/cm² (gauge) in turn on a plastic net of 60 mesh. Further, another sample of the same mixed web material as in the above was mounted and was jet-treated with the same column water streams. The sheet obtained was shrunk (by 30% in the MD direction and 29% in the CD direction) in saturated steam, was napped and was then impregnated with a polyurethane emulsion thereby forming a sheet of 3% by weight polyurethane based on the total weight of the fibers. The sheet obtained was a soft suede sheet of a thickness of 1.0 mm, a weight of 260 g/m², a strength of 290 kg/cm/g/cm² and a cantilever bending length of 26 mm.

EXAMPLE 18

Two cross webs of a weight of 30 g/m² were made of polyester staples (of a fineness of 1.5 deniers and a fiber length of 51 mm) having a latent boiling water shrinkage of 40% with a roller carding machine and cross webber. A gauze fabric of a weight of 30 g/m² spun and woven of the same polyester staples was inserted between these two webs to form a laminate.

Apart from this, a copolymer of an ultimate viscosity of 1.7 (measured in dimethylformamide at 25° C.) consisting of 92% by weight acrylonitrile, 7.5% by weight methylacrylate and 0.5% by weight sodium methallylsulfate was dissolved in dimethylacetamide to prepare a spinning solution of a polymer concentration of 17% by weight. This solution was spun into an aqueous solution of 50% by weight dimethylacetamide, was then elongated to a length four times as long as its original length in boiling water, was dried and was further elongated to a length 1.5 times as long as its length with dry heat at 160° C., thereby obtaining a tow of a single fiber fineness of 1.5 deniers. The filaments were relaxed by 10% in saturated steam and then cut to lengths 3 mm long. These fibers and pulpy collagen fibers obtained by beating chrome tanned leather shaving wastes for 60 minutes were mixed together at a ratio of 70:30 (by weight), were formed into a sheet with a round net sheeting machine and were dried, thereby obtaining a paper material of a weight of 40 g/m$^2$. The paper material was mounted on the above mentioned laminate and the laminate was mounted on a metal screen of 80 mesh and was treated by jetting columnar water streams onto the surface of the papery material five times under pressures of 15, 30, 40, 60 and 60 kg/cm$^2$ in turn from a nozzle having an orifice diameter of 0.15 mm. Another of these above mentioned papery materials was mounted on the sheet obtained and was again jet-treated with columnar water streams under the same conditions as described above. The sheet obtained was dehydrated, was shrunk in boiling water and reduced in area by 40%, was then dried and was thermoset at 150° C. When the sheet was brushed on the other surface of the surface jet-treated with the columnar water streams, a sheet having a very excellent touch and a hand very close to that of natural suede was obtained.

When the structure of this sheet was investigated under a scanning electron microscope, it was recognized that the polyester fibers had been strongly intermingled with each other and with the yarns of the fabric, the acryl microfibers had been pushed into the woven mesh of the fabric while being intermingled with each other and with the polyester fibers and that a part of the microfibers had passed through the fabric to cover the surface on the other side of the surface jet-treated with the columnar water streams.

It was also recognized that the collagen fibers were present not only as pushed in between the polyester fibers but also as embedded between the acryl microfibers on the surface on the other side of the surface jet-treated with the columnar water streams.

EXAMPLE 19

When the sheet obtained in Example 18 was impregnated with an aqueous emulsion of a polyurethane thereby depositing 15% polyurethane on the sheet and was dried, its touch became closer to that of leather and its strength which was 260 kg/cm/g/cm$^2$ untreated with polyurethane increased to a value of 330 kg/cm/g/cm$^2$.

EXAMPLE 20

Two cross webs of a weight of 30 g/m$^2$ were made of staples (of a fineness of 1.5 deniers and a fiber length of 51 mm) of an acrylonitrile copolymer formed from acrylonitrile/vinyl acetate in a ratio of 91/9 (by weight) by using a carding machine and cross webber. A polyester fiber gauze fabric of a weight of 28 g/m$^2$ was inserted between these two cross webs. The same paper material which was used in Example 18 was mounted on the laminate and was then jet-treated on the paper material surface with columnar water streams five times under pressures of 15, 20, 30, 60 and 80 kg/cm$^2$ (gauge) in turn by using a nozzle having an orifice diameter of 0.15 mm on a plastic net of 60 mesh. Another of the above mentioned papery materials was once again mounted on the obtained sheet, was jet-treated with columnar water streams under the same conditions as described above and was dyed by using a circular dyeing machine to obtain a suede sheet very excellent to the touch. The strength of this sheet was 303 kg/cm/g/cm$^2$.

EXAMPLE 21

Two cross webs of a weight of 40 g/m$^2$ were made of polyester staples (of a fineness of 1.5 deniers and fiber length of 51 mm) of a latent boiling water shrinkage of 40% by using a carding machine and cross webber. A nylon tricot knit fabric of 200 cm/480 courses was inserted between the two cross webs. Two of the same paper materials as were used in Example 18 were mounted on the laminate and were jet-treated with columnar water streams under the same conditions as described in Example 20. The obtained sheet was shrunk in area in boiling water by 21%, was dried, thermoset, and dyed with a circular dyeing machine. Thereafter, it was impregnated with an aqueous polyurethane emulsion thereby depositing 17% polyurethane on the sheet, the sheet was dried to obtain a suede sheet of a very excellent touch. The strength of this sheet was 380 kg/cm/g/cm$^2$.

EXAMPLE 22

A cross web of a weight of 60 g/m$^2$ was made of polyester staples (of a fineness of 1.5 deniers and fiber length of 51 mm) having a latent boiling water shrinkage of 40% by using a roller card and cross webber. Two sheets of the same paper materials which were used in Example 18 were mounted on this cross web and were then jet-treated with columnar water streams in the same manner as described in Example 20. The sheet obtained was shrunk in area in boiling water by 46%, was dried, was thermoset and was dyed with a circular dyeing machine. The sheet was impregnated with an aqueous polyurethane emulsion thereby depositing 18% polyurethane on the sheet and then was dried to form a suede sheet of very excellent touch. The strength of this sheet was 290 kg/cm/g/cm$^2$.

Having now fully described the invention, it will be apparent to one of ordinary skill in the art that many changes and modifications can be made thereto without departing from the spirit or scope of the invention as set forth herein.

What is claimed as new and intended to be secured by letters patent is:

1. A method of producing sheet materials, comprising:
    laminating a web material of a short fiber material consisting at least partly of a natural fiber material on a base cloth formed of fibers having a latent shrinkability;
    subjecting said laminate to high pressure liquid jet streams on said web material surface so that said base cloth and web material are substantially integrated with each other;
    and then shrinking the obtained sheet.

2. The method of claim 1, wherein said base cloth is a knit or woven fabric.

3. The method of claim 1, wherein said material is temporarily bonded.

4. The method of claim 1, wherein said web material is formed directly on said base cloth.

5. The method of claim 1, wherein the weight ratio of said base cloth to said short fiber material is 1:4 to 4:1.

6. The method of claim 1, wherein said short fiber material is wool.

7. The method of claim 1, wherein said short fiber material consists of a blend of wool and a second fiber material.

8. The method of claim 1, wherein said short fiber material is feathers, down or a mixture thereof.

9. The method of claim 1, wherein said short fiber material consists of feathers, down, or a mixture thereof and a second fiber material.

10. The method of claim 1, wherein said short fiber material consists of pulp and microfibers smaller than 1.0 denier.

11. The method of claim 1, wherein said short fiber material consists of collagen fibers and microfibers smaller than 1.0 denier.

12. The method of claim 11, wherein said base cloth constitutes 30 to 67% by weight of said sheet material and said collagen fibers and said microfibers constitute 3 to 40% by weight and 30 to 67% by weight respectively of said sheet material.

13. The method of claim 1, wherein said short fiber material is animal hair.

14. The method of claim 1, wherein said short fiber material consists of animal hair and a second fiber material.

15. A method of producing sheet materials, comprising:
laminating a web material of a short fiber material consisting at least partly of a natural fiber material on a base cloth formed of fibers having a latent shrinkability;
subjecting said laminate to a high pressure liquid jet stream on said web material surface so that said base cloth and web material are substantially integrated with each other; shrinking said sheet, and then incorporating an elastic polymer in said integrated laminate in an amount of less than 50% based on the total weight of the base cloth and short fiber material.

16. The method of claim 15, wherein said base cloth is a knit or woven fabric.

17. The method of claim 15, wherein said web material is temporarily bonded.

18. The method of claim 15, wherein said web material is formed directly on said base cloth.

19. The method of claim 15, wherein the weight ratio of said base cloth to said short fiber material is 1:4 to 4:1.

20. The method of claim 15, wherein said short fiber material is wool.

21. The method of claim 15, wherein said short fiber material consists of a blend of wool and a second fiber material.

22. The method of claim 15, wherein said short fiber material is feathers, down or mixtures thereof.

23. The method of claim 15, wherein said short fiber material consists of a mixture of feathers, down or mixtures thereof and a second fiber material.

24. The method of claim 15, wherein said short fiber material consists of pulp and microfibers smaller than 1.0 denier.

25. The method of claim 15, wherein said short fiber material consists of collagen fibers and microfibers smaller than 1.0 denier.

26. The method of claim 25, wherein the amounts of said base cloth, collagen fibers, microfibers and elastic polymer are 30 to 67%, 3 to 4%, 30 to 67% and less than 10% respectively, based on the total weight of said base cloth, collagen fibers, and microfibers.

27. The method of claim 15, wherein said short fiber material is animal hair.

28. The method of claim 15, wherein said short fiber material consists of animal hair and a second fiber material.

29. The sheet material produced by the method of claim 1.

30. The sheet material produced by the method of claim 15.

* * * * *